E. G. RUST.
LOADING MACHINE.
APPLICATION FILED OCT. 3, 1919.
1,355,003.
Patented Oct. 5, 1920.
3 SHEETS—SHEET 3.
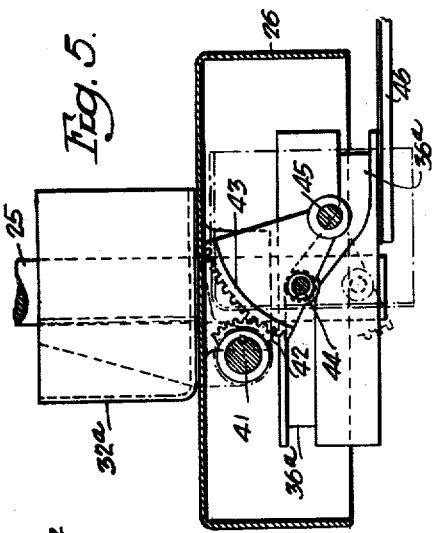
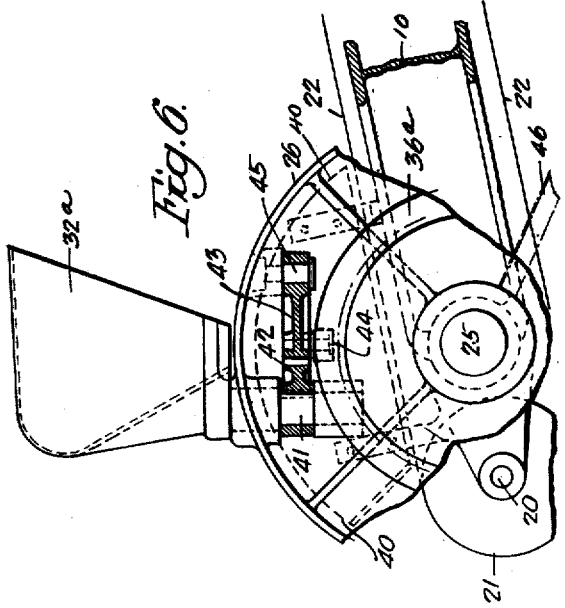
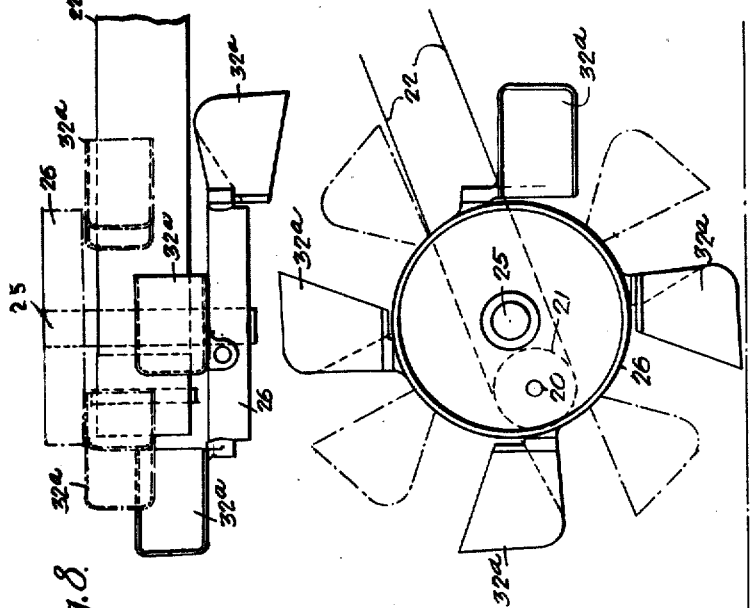
Inventor—
Edwin G. Rust.
by his Attorneys—
Howson + Howson

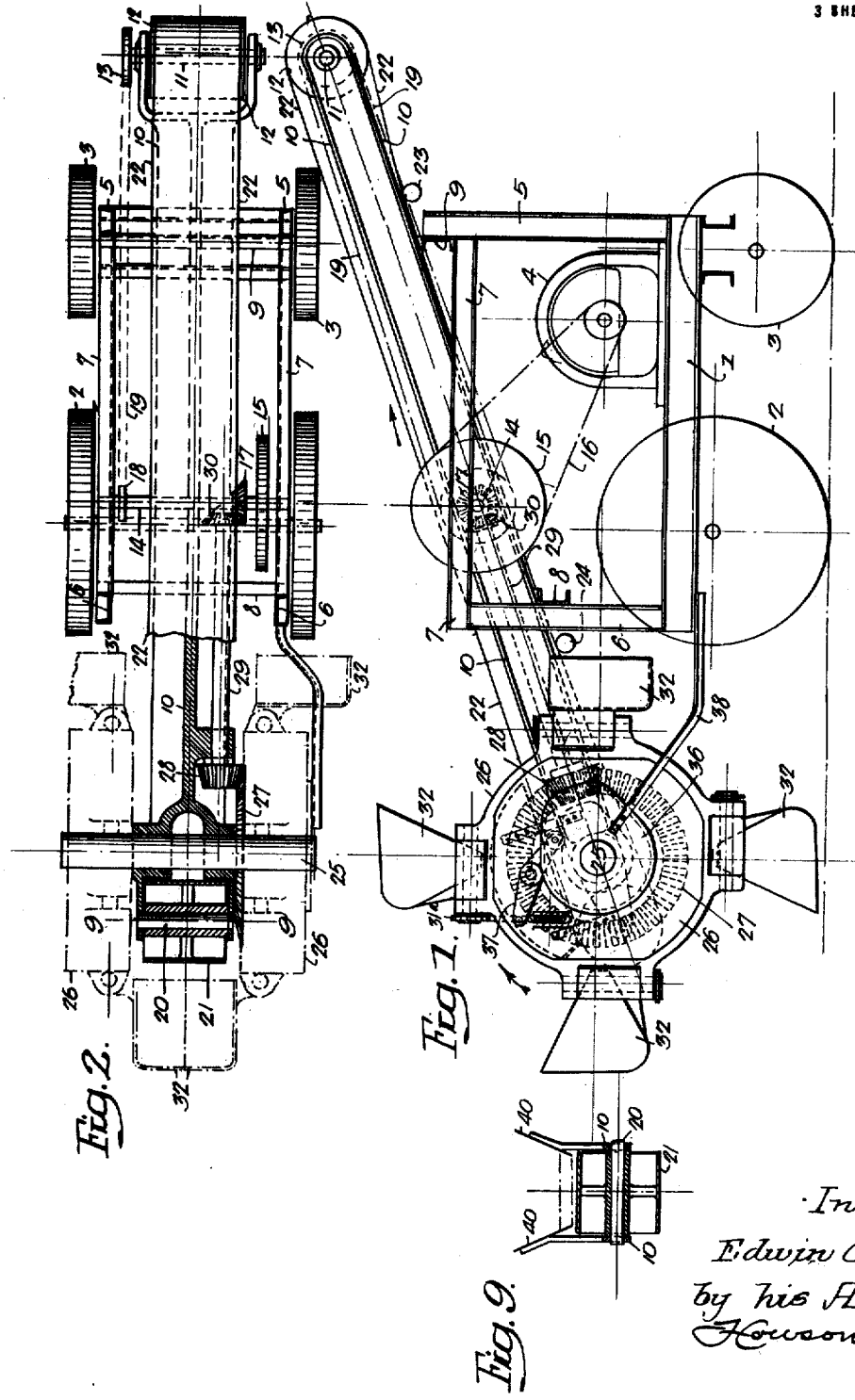

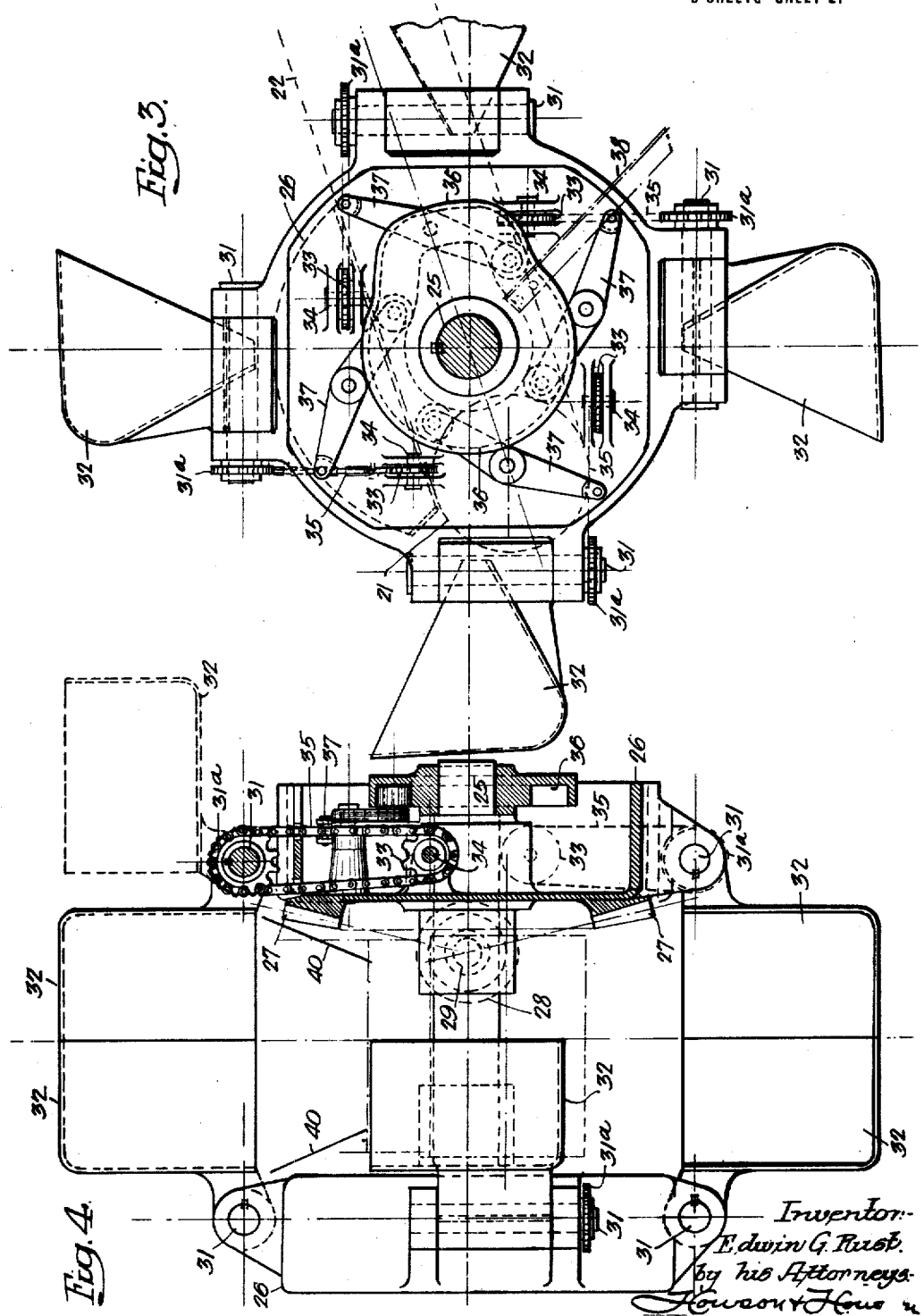

UNITED STATES PATENT OFFICE.

EDWIN G. RUST, OF PHILADELPHIA, PENNSYLVANIA.

LOADING-MACHINE.

1,355,003.   Specification of Letters Patent.   Patented Oct. 5, 1920.

Application filed October 3, 1919. Serial No. 328,225.

*To all whom it may concern:*

Be it known that I, EDWIN G. RUST, a citizen of the United States, residing in Philadelphia, Pennsylvania, have invented Loading-Machines, of which the following is a specification.

One object of my invention is to provide a substantial, durable, compact and efficient machine of the portable type for loading material such as sand, coal, etc., from a pile thereof into a wagon or car;—the construction being such as to permit of the employment of a series of scoops or buckets operative to receive material and deliver it to a traveling belt or other suitable conveyer so mounted as to extend into and work within the space or path traversed by said buckets.

The invention further contemplates novel mechanism for automatically moving the buckets of a loading or gathering machine in order to cause each of them, after receiving and discharging a body of material upon a receiving device or structure such as a conveyer to clear said structure and thereafter return to a path of movement intersecting the latter.

Another object of the invention is to provide a loading machine including a continuous belt conveyer or equivalent device, together with loading elements movable at one end and between the planes of the sides of said conveyer, and mechanism for automatically causing the elements of said loading device to move to one or both sides of the conveyer at points where they would otherwise strike the same.

These objects and other advantageous ends I attain as hereinafter set forth, reference being had to the accompanying drawings, in which, Figures 1 and 2 are respectively a side elevation and a plan, the latter being partly in section, illustrating one form of my invention;

Fig. 3 is a side elevation on a larger scale than Fig. 1, illustrating the detail construction of the rotary bucket-carrying structure and its associated parts, the supporting shaft being shown in section;

Fig. 4 is a rear elevation partly in section further showing the structure shown in Fig. 3;

Figs. 5 and 6 are respectively a plan and a side elevation, both partly in section, illustrating a modified form of bucket swinging mechanism;

Figs. 7 and 8 are respectively side and end elevations of a modified form of the bucket carrying element and its associated parts; and Fig. 9 is a vertical section on the line 9—9, Fig. 2.

In the above drawings, 1 represents a body preferably supported upon wheels 2 and 3 so as to be conveniently portable and capable of carrying the mechanism constituting my invention. This body has mounted upon it any suitable source of power such as an electric motor 4 and also carries a frame including front members, 5 rear members 6 and top members 7.

The vertical members 6 are connected by a transverse element 8 and the front members 5 are likewise connected by a second transverse member 9 which with said member 8 serves to carry an elongated beam 10 extending at an acute angle to the horizontal with its forward end elevated. Said end is forked and its branches provide bearings for a horizontal shaft 11 on which is fixed a pulley 12 and a sprocket wheel 13. Adjacent its middle part said beam also provides bearings for a second transversely extending shaft 14 having fixed to it a sprocket or pulley wheel 15 driven through a chain or belt 16 from the rotary element of the motor 4; there being also mounted on this shaft 14 a sprocket wheel 18 and a beveled gear 17, of which the first is connected by a belt or sprocket chain 19 with the sprocket wheel 13 of the shaft 11.

At its lower and rear end the beam 10 is likewise forked and has bearings in its branches for a third transverse shaft 20 carrying a pulley 21 and this with the pulley 12 at the upper end of said beam, serves to support a conveying belt or apron 22 whose lower run is elevated by rollers 23 and 24 so as to clear the transverse supporting members 8 and 9 of the frame. The lower end of the beam 10 immediately above the third transverse shaft 20 has bearings for a relatively heavy main shaft 25 having fixed to its ends two substantially circular flanged plates or spiders 26.

One of said spiders has fixed to or formed integral with its inner face a beveled gear 27 meshing with a beveled pinion 28 fixed to a shaft 29 mounted in bearings carried by the beam 10 so as to extend substantially parallel therewith. This shaft has fixed to its upper end a second beveled pinion 30 meshing with the beveled gear 17 on the shaft 14 so that power is transmitted from the motor 4 to the main shaft 25 through a chain or belt 16, the pulley 15, shaft 14, beveled gears 17 and 30, shaft 29 and beveled gears 28 and 27 to the spider 26 and main shaft 25.

Each of the spiders 26 has peripherally mounted forks providing bearings for spindles 31, and in the present instance I have illustrated my machine as equipped with four of these spindles arranged around the spider 90° apart, although obviously a greater or less number of these with their associated parts may be provided without departing from my invention.

Each of the spindles 31 has fixed to it a scoop or bucket element 32 which is thus mounted so as to swing in a line lying in a plane intersecting the main shaft 25 and in the present instance each of the elements 32 carried by the spiders 26 constitutes half of a bucket designed to coact with a similar but oppositely mounted half element carried by the second spider on the other end of the shaft 25. For this purpose when the shafts 31 of an adjacent pair occupy certain definite positions the bucket elements 32 carried by them meet edge to edge so as to form a complete bucket or scoop as shown in Fig. 4 and lie or extend between two parallel planes defined by the sides of the conveying belt or apron 22.

Since, as shown, the main shaft 25 extends between the runs of this apron, it is obvious that the bucket elements when in their closed or meeting positions, would extend over and their movement would be interfered with by the conveying apron and the beam 10, when the shaft 25 is turned. I therefore provide mechanism whereby under operating conditions the bucket elements are positively held together as they are turned from a point below the conveyer and move through an arc of something over 180° to a point at which they are over said conveyer, after which they are caused to separate so that as the movement of the shaft 25 with the spiders 26 is continued, they will pass the opposite sides of the conveyer respectively, without striking the same. For this purpose each of the spindles 31 has one of its ends extended beyond its supporting bearing and carries a relatively fixed sprocket wheel 31ª. A second sprocket wheel 33 is mounted on a short spindle 34 carried in bearings supported by the body of the spider 26, and a chain 35 operatively connects these two sprockets.

On each of the ends of the shaft 25 is loosely mounted a cam 36 having a groove or other suitably formed portion designed to act upon one end of each of four levers 37 pivoted or fulcrumed to the body of the spider 26 and having their opposite ends respectively connected to the chains 35. These cams 36 are held stationary while the shaft 25 turns, by means of bars 38 rigidly connecting them to the rear portion of the frame of the machine and are so designed that for the greater part of the revolution of the spiders they retain the levers 37 in such positions that through the chains 35, sprockets 31ª and spindles 31 the bucket elements 32 are held in their closed or engaging positions shown in Fig. 4. When however any pair of bucket elements is being moved from its highest position down toward the conveying belt or apron 22, said cams so act upon the levers that they impart longitudinal movement to those portions of the sprocket chains 35 which they respectively engage, with the result that the bucket elements 32 of one coacting pair are swung away from each other through angles of 90° into positions on opposite sides of the belt 22 as indicated in dotted lines in Fig. 2, where they are maintained until the spiders have so far rotated as to bring them below said belt or conveyer. The cams thereupon cause movement of the chains 35 belonging to the separated pair of bucket elements such that these are swung together into their closed or engaging positions.

With the above described arrangement of parts when it is desired to transfer or load material, such as coal, from a pile of the same to a wagon or car, my machine would be backed by its own power or otherwise so that its rear or bucket-carrying portion occupies a position immediately adjacent such pile where it is held as by chocks under its wheels 3 or by means of suitable brakes applied to the latter. The motor 4 being put in operation, will thereupon drive the belt or apron 22 of the conveyer so that its upper run moves upwardly and at the same time the shaft 25 with the spiders 26 is turned in a clockwise direction, with the result that the bucket elements of the lowest pair dig into or scoop up a body of coal and after raising it above the belt 22, deliver it upon the lower end of the upper run of the same. In order to prevent the coal from spreading or falling from the sides and rear of the conveyer I provide a guiding hopper 40 having sides and a rear end and open at its front. This hopper is supported in any suitable manner from the adjacent lower end of the beam 10 as shown in Fig. 9.

Immediately after any pair of coacting bucket elements 32 discharges its contents upon the belt 22, the cams 36 belonging to said pair so operate upon their associated levers 37 that said elements are swung apart into the positions indicated in dotted lines in Fig. 4 and while held in these positions, are moved downwardly past the sides of the belt, being thereafter brought together in time to properly receive another charge of material from the pile. The material dumped upon the belt 22 is carried upwardly thereby and is discharged from its top end into a car or wagon suitably placed in front of my machine.

It is immaterial whether as shown in Figs. 1 to 4 inclusive, the bucket sections swing in lines lying in planes intersecting the center line of the shaft 25 or whether they swing on axes parallel with lines radial to said shaft as shown in Figs. 5 and 6. In the latter case each of the spiders 26 is provided with bearings for the reception of spindles 41 on which the bucket sections 32<sup>a</sup> are fixed and each of these spindles has fixed on it a toothed segment 42 engaging the teeth of a second segment 43 mounted to oscillate on a pin 45 suitably mounted on the spider. Each of these latter segments has a projecting pin or roller 44 operated on by a cam 36<sup>a</sup> which as before is loosely mounted on the outer end of the shaft 25 and is held stationary by the main frame of the machine in any suitable manner, as by a bar 46 connected to the frame 1. In this case as the bucket sections approach the conveying belt 22 after discharging their contents upon it, the cam so acts upon the segment 43 as to cause it to swing the segment 42 and turn the spindle 41 with the bucket element 32<sup>a</sup> through an angle of about 90° so as to permit it to pass said conveying belt.

If it should be considered advisable to more uniformly distribute the load put upon the motor 4 by the intermittent engagement of the buckets with the pile of material being loaded, I may axially displace the spiders 26 relatively to each other on the shaft 25 so that the bucket elements 32 instead of coacting in pairs, are staggered as shown in Figs. 7 and 8. In such case each element 32 is complete in itself, i. e.,—it is provided with opposite sides, instead of having but one side as in Figs. 1 to 6 inclusive, so that under operating conditions the bucket elements of the two spiders alternately engage the pile of material and receive their charges therefrom. As before however, after each bucket has discharged its contents upon the conveying belt 22, it is swung outwardly through an angle of substantially 90° so as to pass the belt as before explained.

It is particularly to be noted that while my machine is adapted for transferring material from a pile to a wagon, it may be advantageously utilized in some cases for excavating or digging sand or any other material and delivering this to cars or wagons suitably placed with relation to the conveyer 22. Obviously this latter may be given any of a number of forms without departing from my invention, so that it is capable of receiving the material delivered by the buckets or bucket elements and transferring this to the vehicle or point at which it is desired it shall be delivered.

I claim:

1. The combination in a loading machine of a supporting frame; an endless conveyer mounted in a permanent position thereon; a series of buckets for delivering material to said conveyer and operative in a path intersecting the same; with means for automatically moving the buckets after they have discharged material on the belt to cause them to pass the same and thereafter return them to normal positions.

2. The combination in a loading machine of a supporting frame; an endless conveyer mounted in a permanent position on said frame; a rotary member mounted adjacent one end of the conveyer; a bucket or buckets carried by said member so as to be movable in a path intersecting said conveyer; with mechanism for automatically swinging said buckets on said member to cause them to pass the conveyer after delivering their contents thereto, and thereafter return to normal positions.

3. The combination in a loading machine of a supporting structure; a conveyer mounted thereon in a permanent position; a rotary structure mounted adjacent one end of said conveyer; a series of buckets pivoted to said structure and movable within the plane defined by said conveyer; with automatic mechanism for periodically swinging said buckets on their pivots to cause them to pass said conveyer and thereafter return to their normal relative positions.

4. The combination of a supporting structure; a conveyer mounted thereon; a spider carried by said structure at one side of the conveyer; a series of buckets pivotally mounted on the spider so as to overhang the conveyer; and cam mechanism for automatically swinging the buckets to one side of the conveyer after they have discharged their contents thereon and then returning them to their normal positions.

5. The combination of a supporting structure; a belt conveyer mounted thereon; a rotary spider at the side of said conveyer; buckets movably mounted on said spider and movable therewith in a path between the planes of the sides of said conveyer during their filling and discharging; with means for automatically moving the buckets out of said path to permit them to pass the conveyer after they have discharged their contents thereon and thereafter return to their normal positions.

6. The combination in a loading machine of a supporting structure; a conveyer mounted thereon; two spiders mounted on opposite sides of the conveyer; buckets pivotally mounted on said spiders and movable in a path between the planes of the sides of the conveyer while they are receiving and discharging material; with mechanism for actuating the buckets to permit them to pass the conveyer and thereafter returning them to their normal positions.

7. The combination in a loading machine of a supporting structure; a conveyer mounted thereon; two spiders mounted on opposite sides of the conveyer; two pairs of coacting bucket sections pivotally mounted on said spiders and movable in a path between the planes of the sides of the conveyer while they are receiving and discharging material; with automatic mechanism for separating the bucket sections of each pair to permit them to pass the conveyer and thereafter returning them to their normal positions.

8. The combination of a supporting structure; an elongated beam mounted thereon; a belt conveyer supported by said beam; a shaft also carried by the beam and extending between the runs of said conveyer; spiders carried by said shaft; buckets movably carried by the spiders in positions to overhang the conveyer at certain parts of their movement; and mechanism for automatically swinging the buckets out of their overhanging positions to permit them to pass the conveyer.

9. The combination in a loading machine of a movably mounted supporting structure; an inclined conveyer mounted in a permanent position thereon; a bucket loader carried by the supporting structure adjacent the lower end of the conveyer including buckets movable during their filling and discharge in a path between the planes of the sides of said conveyer; with mechanism for automatically shifting the positions of the buckets after their discharge to permit them to pass the conveyer and thereafter return to their normal positions.

10. The combination in a loading machine of a supporting structure; a conveyer mounted thereon; and means for delivering material to one end of said conveyer consisting of a rotary spider; a series of buckets pivotally mounted on said spider; a fixed cam mounted adjacent the spider; and mechanism connecting each of the buckets with the cam for swinging it through an angle of substantially 90° into and out of a position such as would permit it to pass the conveyer as the spider is turned; with means for rotating the spider.

11. The combination in a loading machine of a supporting structure; a conveyer mounted thereon; and means for delivering material to one end of said conveyer consisting of a rotary element; two series of buckets pivotally mounted on said element in staggered relation; and mechanism for alternately swinging the buckets on their pivots to permit them to pass the conveyer and thereafter return to their normal positions.

In witness whereof I affix my signature.

EDWIN G. RUST.